United States Patent
Labate

(10) Patent No.: US 12,390,722 B2
(45) Date of Patent: *Aug. 19, 2025

(54) ONLINE GAMING FOR STREAMING PLAYERS

(71) Applicant: Electronic Arts Inc., Redwood City, CA (US)

(72) Inventor: Jesse Alan Labate, San Jose, CA (US)

(73) Assignee: Electronic Arts Inc., Redwood City, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 18/128,134

(22) Filed: Mar. 29, 2023

(65) Prior Publication Data
US 2023/0233932 A1 Jul. 27, 2023

Related U.S. Application Data

(63) Continuation of application No. 17/248,377, filed on Jan. 22, 2021, now Pat. No. 11,648,470.

(51) Int. Cl.
*A63F 13/355* (2014.01)

(52) U.S. Cl.
CPC .................... *A63F 13/355* (2014.09)

(58) Field of Classification Search
CPC ..... A63F 13/355; A63F 13/358; A63F 13/335
See application file for complete search history.

(56) References Cited

U.S. PATENT DOCUMENTS

| | | | |
|---|---|---|---|
| 2016/0072716 A1 | 3/2016 | Chow et al. | |
| 2016/0192035 A1* | 6/2016 | Maisenbacher | H04N 21/438 725/93 |
| 2021/0146240 A1* | 5/2021 | Colenbrander | A63F 13/335 |
| 2021/0184943 A1* | 6/2021 | Jia | H04W 40/18 |
| 2022/0062763 A1 | 3/2022 | Wong | |

OTHER PUBLICATIONS bradhedlund.com/2008/12/19/how-to-calculate-tcp-throughput-for-long-distance-links/, How to Calculate TCP throughput forlong distance WAN links_ Brad Hedlund.pdf (Year: 2008).

(Continued)

*Primary Examiner* — Yingchuan Zhang
(74) *Attorney, Agent, or Firm* — Lee & Hayes, P.C.

(57) ABSTRACT

A streaming system may improving online gaming experiences for streaming players and/or providing device independent input processing. The streaming system may receive, from a client device, a selection of a game to be played via a streaming system, determine network connection parameters based at least in part on the game, determine a current streaming quality of the network connection of the client device, and determine the current streaming quality does not meet the network connection parameters. Based on the determination that the current streaming quality does not meet the network connection parameters, the streaming system may cause a prompt to be displayed to a player associated with the client device regarding alternative content for the player to play or cause at least a portion of the gameplay of the game to be slowed based at least in part on the current streaming quality and the network connection parameters.

20 Claims, 5 Drawing Sheets

(56) References Cited

OTHER PUBLICATIONS

Introducing Time Dilation, https://www.eveonline.com/news/view/introducing-time-dilation-tidi, Introducing TimeDilation.pdf, published on Apr. 22, 2011 (Year: 2011).
Office Actin for U.S. Appl. No. 17/248,377, mailed on Aug. 11, 2022, Labate, "Improved Online Gaming for Streaming Players", 14 pages.

\* cited by examiner

ONLINE GAMING FOR STREAMING PLAYERS

CROSS-REFERENCE TO RELATED APPLICATION

This application is a continuation of and claims priority to U.S. application Ser. No. 17/248,377, filed on Jan. 22, 2021 and entitled "IMPROVED ONLINE GAMING FOR STREAMING PLAYERS," the entirety of which is incorporated herein by reference.

BACKGROUND

Online gaming allows for players to play a variety of electronic and/or video games with each other via network connectivity, such as via the Internet. Users who wish to play a game may be matched with each other to play the game, even though those players may be remotely located from each other. Online gaming may be enabled by gaming system(s) to which each of the players may connect using client devices. Some client devices may be game client devices, and other client devices may be streaming client devices. The streaming client devices may receive rendered game content (e.g., video, audio, haptics, etc.), from a remote streaming system(s), while game client devices may receive game state data from the gaming system(s) and locally render the game content for the player.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
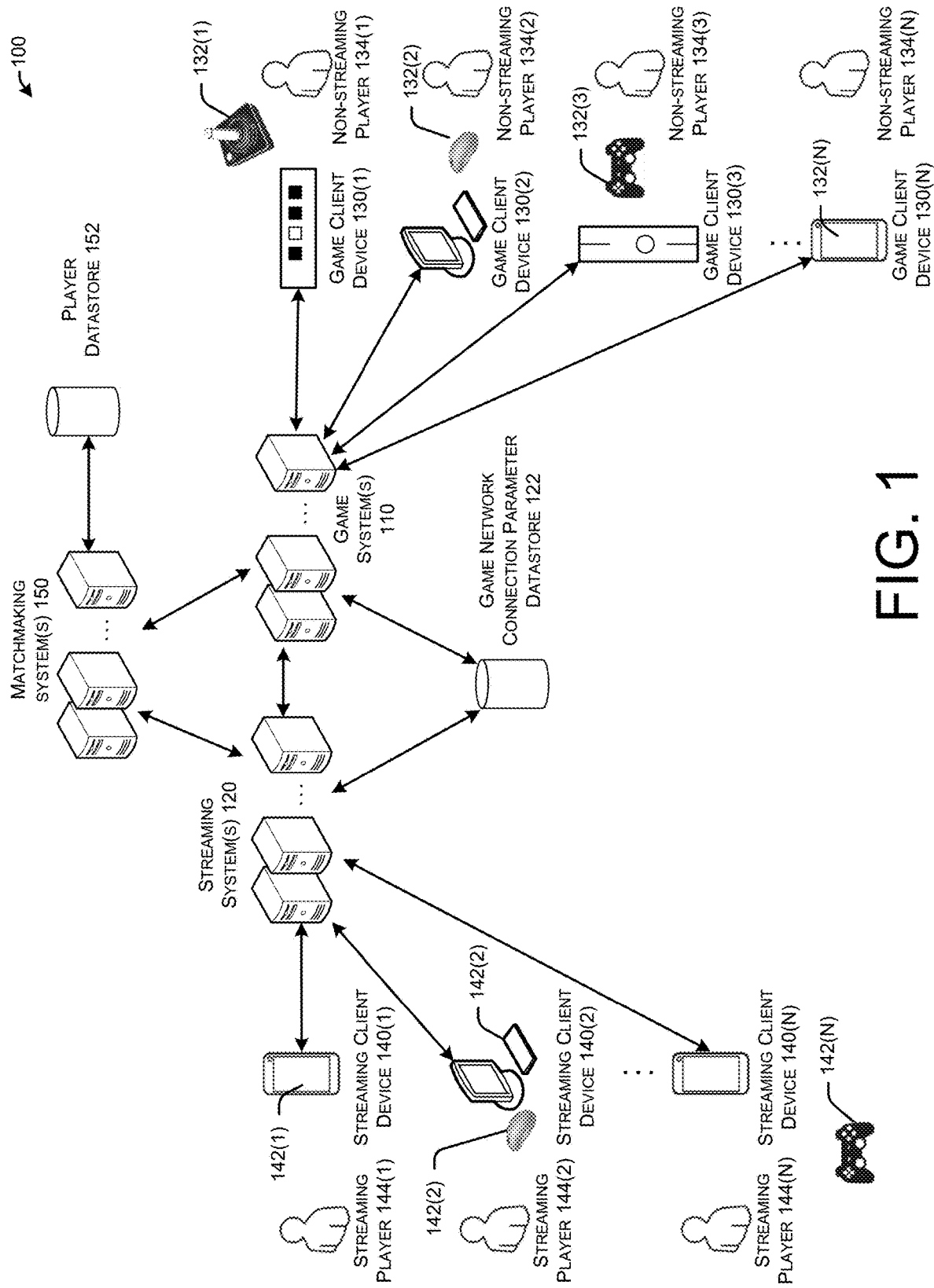
FIG. 1 illustrates a schematic diagram of an example environment with gaming system(s) and steaming system(s) to enable online gaming via game client device(s) and streaming client device(s), in accordance with example embodiments of the disclosure.

Example embodiments of this disclosure describe methods, apparatuses, computer-readable media, and system(s) for improving online gaming experiences for streaming players and/or providing device independent input processing.

In example embodiments of the disclosure, online game streaming system(s) may improve online gaming experiences for streaming players based on the streaming players' current network connection. For example, the streaming system(s) may determine that a game or portion of a game requested by a streaming player may be impacted by the player's current network connection. In some examples, when the player's network connection has an end-to-end latency that is higher than a threshold, the game or the portion of the online game the player has requested to play may be more difficult than normal. Specifically, the difficulty may be increased due to, for example, narrower response windows for player input due to the latency. Portions of games that are normally within normal human reaction times, when presented to the player with a delay due to latency, may instead require reaction times by the player that are not humanly possible. In other examples, the portion on the online game the player has requested to play may not become overly difficult or impossible, but, due to the latency, may have disrupted gameplay, for example, due to overlapping timings. For example, a dialogue or event presented to the player in the game based on a timing that is similar to the player's latency may be displayed for too brief a time for the player to properly understand the content presented. In a particular example, a brief view of a plot element in the game that is programmed to be shown only if the player enters an input within a limited time may not be shown at all if the response window closes before the player can possibly react. This may not prevent the player from completing the game (e.g., if the player can access the plot information outside the game), but it may disrupt the player's immersion and/or negatively impact the player's gaming experience.

In some examples, the streaming system(s) may provide recommendations for or against the requested game or requested portion of the game based on the player's current network connection. For example, in response to a determination that the game or the portion of the game requested by the streaming player may be impacted by the player's current end-to-end latency due to narrower response windows for player input, the streaming system(s) may notify the player that the requested game or requested portion of the game may require better reaction times to onscreen prompts than the player's current network connection will likely allow the player to meet. The streaming system(s) may also provide suggested alternatives to the requested game or portion of the game. For example, the streaming system may recommend against the requested game or requested portion of the game and instead suggest the player play different content which may not be as reaction-time dependent (e.g., a different mode or portion of the requested game or a different game altogether).

In addition or alternatively, the streaming system(s) may operate to modify the presentation of the game or the portion of the game based on the player's current network connection. For example, in response to a determination that the game or the portion of the game requested by the streaming player may be impacted by the player's current end-to-end latency (e.g., due to narrower response windows for player input), the streaming system(s) may slow down gameplay of the game or slow down gameplay of the game during the impacted portion of the game. For example, the streaming system may cause execution of the game by the streaming service to be slowed, resulting in a time dilation effect in the presentation of the game (e.g., presenting the game in slow motion). By deliberately introducing the slowdown, the streaming system(s) may allow the player a reasonable chance to succeed (e.g., due to an increased window for the player to successfully react to audiovisual prompts).

While the above discussion of slowdowns related to operations performed in response to a player's current network conditions being below a threshold, some examples may provide the above discussed operations for all streaming players. Some games, or portions of games, may be latency or timing sensitive enough that the games or the portions of the games may be effectively unplayable over any remote streaming system. In such a case, the streaming system may recommend the player play a different mode, portion, or game, or the streaming system may provide the requested game with slowdowns as discussed above.

Additionally, in example embodiments of the disclosure, the gaming system(s) disclosed herein may provide for device independent input processing of player input to reduce advantages and/or disadvantages associated with different network or gameplay connections and/or setups. For example, in cases of streaming players versus non-streaming players, the gaming system(s) disclosed herein may reduce unintended or unfair advantages of non-streaming players over streaming players caused by the non-streaming players experiencing an input-delay time advantage versus streaming player.

Streaming players may have a streaming client device on which the current state of the online game may be presented to the streaming players. This presentation may include any variety of content, such as video, audio, haptics, or any other suitable rendered output that represents the current state of the online game and can be perceived by the player. The streaming client device may receive the content to be presented to the streaming player from one or more streaming system(s). Thus, the content of the online game, for the streaming player, may be rendered at one or more streaming system(s) and streamed to the streaming player's streaming client device for presentation to the streaming player. Similarly, player input may be received at an input device of the streaming client device and then forwarded to the streaming systems for processing and/or further forwarded to a gaming system that may be hosting an online match.

On the other hand, a non-streaming player may engage with the game via his or her game client device, which renders the game locally at the client device. Thus, there is no need for one or more streaming system(s) to render and stream the online game content for the non-streaming players. Similarly, player input may be received at an input device of the game client device and then processed locally and/or forwarded to a gaming system that may be hosting an online match from the local device.

In many cases, the streaming of the game, the network latency and/or network bandwidth limits associated therewith, may result in a delay in the rendering of the game for a streaming player relative to a non-streaming player. This latency, in turn, may cascade to a disadvantage in response times of streaming players to events in the online game relative to non-streaming players.

To address input delay time-advantages, some examples according to this disclosure may build-in an amount of input processing delay to the game that would be experienced by any player playing the game, whether on a local game client device or a streaming client device interacting with a streaming system. For example, a game according to this disclosure may be configured to include an input processing delay of 100 ms, whether played in a streaming or non-streaming environment and regardless of gaming device or gaming setup. Generally, in an online match, when a non-streaming player provides a player input at the same time as a streaming player, the non-streaming player's input is processed first because it generally arrives first at the gaming system(s) hosting the online match. In an example according to this disclosure having an input processing delay of 100 ms, where the non-streaming player's player input arrives 10 ms after being input by the non-streaming player and the streaming player's player input arrives 80 ms after being input by the streaming player, the gaming system(s) hosting the online match may delay processing of the non-streaming player's player input by 90 ms (e.g., the difference of 100 ms and 10 ms) and delay processing of the streaming player's player input by 20 ms (e.g., the difference of 100 ms and 80 ms). As such, both player's player input may be processed substantially at the same time, thereby reducing or eliminating input delay time-advantages and/or disadvantages. In addition to addressing input delay time-advantages, configuring a game to include an input processing delay as discussed herein may also reduce or eliminate the experiential difference between streaming and non-streaming gameplay (e.g., for a user who switches between steaming and non-streaming play), promote fairness in a multiplayer session with a mixed group of players, improve the perceived quality of a streaming experience versus a non-streaming experience and provide consistency in the gameplay experience generally.

The device independent input processing techniques herein are not limited to addressing streaming vs. non-streaming differentials, network condition differentials or latency differentials. For example, the device independent input processing disclosed herein may be used to address input delay time-advantages caused by different input devices and/or different gaming devices (e.g., a console A, a console B or a PC).

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with game system(s) 110 and steaming system(s) 120 to enable online gaming via game client device(s) 130 and streaming client device(s) 140, in accordance with example embodiments of the disclosure.

The example environment 100 may include one or more non-streaming player(s) 134(1), 134(2), 134(3), . . . 134(N), hereinafter referred to individually or collectively as non-streaming player(s) 134, who may interact with respective game client device(s) 130(1), 130(2), 130(3), . . . 130(N), hereinafter referred to individually or collectively as game client device(s) 130 via respective input device(s) 132(1), 132(2), 132(3), . . . , 132(N), hereinafter referred to individually or collectively as input devices 132.

The example environment 100 may further include one or more streaming player(s) 144(1), 144(2), . . . 144(N), hereinafter referred to individually or collectively as streaming player(s) 144, who may interact with respective streaming client device(s) 140(1), 140(2), . . . 140(N), hereinafter referred to individually or collectively as streaming client device(s) 140 via respective input device(s) 142(1), 142(2), . . . , 142(N), hereinafter referred to individually or collectively as input devices 142.

The game client devices 130 may be configured to render content associated with the online game to respective non-streaming players 134. This content may include video, audio, haptic, combinations thereof, or the like content components. The game client device(s) 130 may receive game state information from the one or more game system(s) 110 that may host the online game played by the player(s) 134, 144 of environment 100. The game client device(s) 130 may use the game state information to render current events of the online game as content. The game state information may be received repeatedly and/or continuously and/or as events of the online game transpire. The game state information may be based at least in part on the interactions that each of the player(s) 134, 144 have via their input device(s) 132, 142 responsive to events of the online game hosted by the game system(s) 110.

As events transpire in the online game, the game system(s) 110 may update game state information and send that game state information to the game client device(s) 130. For example, if the players 134, 144 are playing an online soccer game, and the player 134, 144 playing one of the goalies move in a particular direction, then that movement and/or goalie location may be represented in the game state information that may be sent to each of the game client device(s) 130 for rendering the event of the goalie moving in the particular direction. In this way, the content of the online game is repeatedly updated throughout game play. When the game client device(s) 130 receive the game state information from the game system(s) 110, the game client device(s) 130 may render updated content associated with the online game to its respective player 134. This updated content may embody events that may have transpired since the previous state of the game (e.g., the movement of the goalie).

The game client device(s) 130 may accept input from respective non-streaming players 134 via respective input device(s) 132. The input from the non-streaming players 134 may be responsive to events in the online game. For example, in an online basketball game, if a non-streaming player 134 sees an event in the rendered content, such as an opposing team's guard blocking the paint, the non-streaming player 134 may use his/her input device 132 to try to shoot a three-pointer. Intended action by the non-streaming player 134, as captured via his/her input device 132 may be received by the game client device 130 and sent to the game system(s) 110.

The game client device(s) 130 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 130 may execute programs thereon to interact with the game system(s) 110 and render game content based at least in part on game state information received from the game system(s) 110. Additionally, the game client device(s) 130 may send indications of player input to the game system(s) 110. Game state information and player input information may be shared between the game client device(s) 130 and the game system(s) 110 using any suitable mechanism, such as application program interfaces (APIs).

The game system(s) 110 may receive inputs from various players 134, 144 and update the state of the online game based thereon. As the state of the online game is updated, the state may be sent to the various game client system(s) 130 for rendering online game content to players 134. In this way, the game system(s) 110 may host the online game or match.

Additionally, the game state information may also be sent by the game system(s) 110, and on behalf of the streaming player(s) 144, to the streaming system(s) 120. In example embodiments, the streaming system(s) 120 may receive online game state information from the game system(s) 110, render the content of the online game for the streaming players 144, and stream the rendered online content to individual ones of the streaming client devices 140. The streaming system(s) 120, therefore, may be able to use the game state data from the gaming system(s) 110 to render the online game for the streaming players 144, without the streaming client device(s) 140 having to render the content associated with the online game. The streaming players 144 may experience (e.g., view, hear, feel, etc.) the content associated with the online game on their streaming client devices 140 based at least in part on streaming content as received from the streaming system(s) 120.

As discussed above, there may be network latency and/or relatively low network bandwidth between the streaming system(s) 120 and the streaming client device(s) 140 when transmitting the streaming content to the streaming client devices 140. This network latency and/or network bandwidth limitations between the streaming client device(s) 140 and the streaming system(s) 120 may result a delay in the presentation of the content to the streaming players 144. In single player and multiplayer games, this may result in a narrower window for reaction times for streaming players 144 (e.g., due to the additional time for rendered content to be transmitted over a wide area network instead of a dedicated multimedia cable and the additional time for player input to be transmitted over the wide area network). Similarly, in multiplayer online games, the streaming players 144 may experience the content associated with the online game at a time after when the non-streaming players 134 experience the same content and processing of player input of the streaming players may be delayed relative to the processing of player input of the non-streaming players, providing unintended or unfair advantages to non-streaming players over streaming players.

The streaming system(s) 120 may measure network speed information (e.g., network latency, network bandwidth, etc.) between itself and a streaming client device 140 corresponding to a streaming player 144 who wishes to play an online game. The streaming system(s) 120 may measure network speed by any suitable mechanism, such as an end-to-end latency and/or a ping test. End-to-end latency may refer to the time taken for a packet to be transmitted across a network from source to destination, such as a player input to be sent to the streaming system(s) 120 and/or forwarded to the game system(s) 110 (e.g., in the context of a online game being hosted by the game system(s) 110). A ping test may measure an amount of time it takes a round-trip ping, such as a ping to be sent from the streaming system(s) 120 and a response ping to be received back by the streaming system(s) 120. This measurement of pingback time may be used to determine network speed, such as network latency.

In addition, the game client devices 130, streaming client device(s) 140 and/or the streaming system(s) 120 may determine and/or measure input device latency for the input devices 132, 142. For example, different input devices for different client device(s) 130, 140 may provide different responsiveness. Based on the input device(s) latency, the system(s) 120 and/or 130 may recommend the player play a different mode, portion or game, provide the requested game with slowdowns and/or perform device independent input processing. The system(s) 110 and/or 130 may determine an input device 142 corresponding to a streaming player 144. This information about a streaming player's input device 142 may be received from any one of game system(s) 110, streaming system(s) 120 and/or streaming client device(s) 140. The input device(s) 142 may be any suitable input device including, but not limited to a touch screen, a mouse, a joystick, a game pad, a wearable sensor device, a motion detection device, combinations thereof, or the like.

The streaming client device(s) 140 may be any of the devices as discussed with respect to the game client device(s) 130, except the streaming client devices operate in a manner where game content is streamed from the streaming system(s) 120, rather than being locally rendered at the streaming client device(s) 140. As a result, the streaming client device(s) 140 may include functionality and/or software to present streaming content to its respective streaming player(s) 144.

As mentioned above, the streaming system(s) 120 may improve online gaming experiences for streaming player(s) 144 based on the streaming player(s)' current network connection. For example, the streaming system(s) 120 may determine that a game or portion of a game requested by a streaming player 144 may be impacted by the player's current network connection. In some examples, when the player's network connection has an end-to-end latency that is higher than a threshold, the game or the portion of the online game the player has requested to play may be more difficult than normal or gameplay may be disrupted.

In some examples, the streaming system(s) may provide recommendations for or against the requested game or requested portion of the game based on the player's current network connection and network connection parameters for the game or for the portion of the game. In some examples, the streaming system(s) 120 may access the network connection parameters for the game or for the portion of the game, such as from a game network connection parameter datastore 122. In response to a determination that the game or the portion of the game requested by the streaming player 144 may be impacted by the player's current end-to-end latency due to narrower response windows for player input, the streaming system(s) 120 may notify the streaming player 144 that the requested game or requested portion of the game may require better reaction times to onscreen prompts than the player's current network connection will likely allow the player to meet. The streaming system(s) 120 may also provide suggested alternatives to the requested game or portion of the game. For example, the streaming system(s) 120 may recommend against the requested game, the requested portion of the game, or the requested mode and instead suggest the player play different content which may not be as reaction-time dependent, such as a different mode or different portion of the requested game or a different game altogether.

In some examples, the streaming system(s) 120 may prompt the player 144 upon selection of the game for initialization. For example, the player 144 may interact with a library of the streaming system(s) 120 to select a game to play by the streaming service. The streaming system(s) 120 may utilize information about the selected game, information about the player associated with the selected game and information about the player's current network connection to determine whether to prompt of the player regarding the possibility of overly difficult or disrupted gameplay.

In a first example, the streaming system(s) 120 may retrieve network connection parameters for the selected game from the game network connection parameter datastore 122 and compare those network connection parameters to the player's current network connection. If the player's current network connection does not meet the game network connection parameters for the game, the streaming service may prompt the player regarding the possibility of overly difficult or disrupted gameplay and recommend against the selected game and instead suggest the player play a different game which may not be as reaction-time dependent.

In a second example, the streaming system(s) 120 may determine a portion of the selected game the streaming player 144 is likely to play and determine network connection parameters for that portion and/or closely associated portions of the selected game. For example, the streaming system(s) 120 may determine the portion of the selected game the player 144 is likely to play based on save files or log data from the player's most recent interaction with the game via the streaming system(s) 120. Then, the streaming system(s) 120 may retrieve network connection parameters for the determined portion and/or closely associated portions of the selected game from the game network connection parameter datastore 122. If the player's current network connection does not meet the network connection parameters for the determined portion and/or closely associated portions of the selected game, the streaming system(s) 120 may prompt the player regarding the possibility of overly difficult or disrupted gameplay and recommend against the selected game or the portion of the game. Depending on the game and the example implementations, the streaming system(s) 120 may suggest the player play a different portion or different mode of the selected game which may not be as reaction-time dependent (e.g., a base management portion a first person role-playing game instead of a combat portion).

In addition or alternatively, the streaming system(s) 120 may prompt the streaming player 144 during gameplay. For example, while the player 144 is interacting with the game via the streaming system(s) 120, the game may provide information to the streaming system(s) 120 about the portion of the game the player is currently playing and/or network connection parameters for the portion of the game the player is currently playing and/or portions of the game associated with the current portion. The streaming system(s) 120 may utilize information provided by the game and/or information about portion of the game retrieved from the game network connection parameter datastore 122 and information about the player's current network connection to determine whether to prompt of the player regarding the possibility of overly difficult or disrupted gameplay. Alternatively or additionally, the streaming system(s) 120 may utilize an API to cause the game to prompt the player in-game.

In a particular example, a player of a first person shooting game may transition, may be about to transition, or may have requested to transition in the game from a "standard" exploring and shooting open-world portion of the game to a quick time event portion of the game. Using the operations discussed above, the streaming system(s) 120 may determine that the network connection parameters of the quick time event portion of the game are not met by the player's current network connection. In response, the streaming system(s) 120 may cause a prompt to be displayed to the player via the streaming system(s) 120 or in game regarding the possibility of overly difficult or disrupted gameplay in the quick time event portion of the game. The prompts may further suggest the player play different content which may not be as reaction-time dependent (e.g., a different portion or different mode of the game or a different game altogether).

In addition or as an alternative to prompting the player 144, the streaming system(s) 120 may operate to modify the presentation of the game or the portion of the game based on the player's current network connection. For example, in response to a determination that the game or the portion of the game requested by the streaming player 144 may be impacted by the player's current end-to-end latency (e.g., due to narrower response windows for player input), the streaming system(s) 120 may slow down gameplay of the game generally or slow down gameplay of the game during the impacted portion of the game. For example, the streaming system(s) 120 may cause execution of the game by the streaming system(s) 120 to be slowed, resulting in a time dilation effect in the presentation of the game (e.g., presenting the game in slow motion). By deliberately introducing the slowdown, the streaming system(s) may allow the player a reasonable chance to succeed (e.g., due to an increased window for the player to successfully react to audiovisual prompts). As above, the streaming system(s) 120 may determine the gameplay may be impacted and/or how severely the gameplay is likely to be impacted based on network connection parameters retrieved from the game network connection parameter datastore 122.

While the above discussion of slowdowns related to operations performed in response to a player's current network conditions not meeting network connection parameters for the game or the portion of the game, some examples may provide the above discussed operations for all streaming players. Some games, or portions of games, may be latency or timing sensitive enough that the games or the portions of the games may be effectively unplayable over any remote streaming system. In such a case, the streaming system may recommend the player play a different mode or game, or the streaming system may provide the requested game with slowdowns as discussed above.

In a first example, the streaming system(s) 120 may retrieve network connection parameters for the selected game or a portion of the selected game the player 144 is likely to play from the game network connection parameter datastore 122 and compare those network connection parameters to the player's current network connection. As discussed above, the streaming system(s) 120 may determine the portion of the selected game the player 144 is likely to play based on save files or log data from the player's most recent interaction with the game via the streaming system(s) 120. Based on the player's network connection and the network connection parameters, the streaming system(s) 120 may determine how severely the gameplay is likely to be impacted. Based on the estimated of the severity of the impact, the streaming system(s) 120 may determine an amount to slow down the execution or gameplay of the game. As noted above, the amount of slowdown may be determined to allow the player a reasonable chance to succeed (e.g., due to an increased window for the player to successfully react to audiovisual prompts). In some examples, the amount of slowdown may be determined to provide a level of difficulty similar to the difficulty of the game or portion of the game when played in a non-streaming environment, such as on a game client device 130. One of skill in the art, in view of this disclosure, would understand a variety of approaches to implement a slowdown of the execution of a game operating on a streaming system(s) 120. For example, the streaming system(s) 120 may implement the slow down by reducing a tick rate of the virtual hardware operating on the streaming system(s) 120 that is executing the game.

In a second example, a player of a first person shooting game may transition, may be about to transition, or may have requested to transition in the game from a "standard" exploring and shooting open-world portion of the game to a quick time event portion of the game. While the player 144 is interacting with the game via the streaming system(s) 120, the game may provide information to the streaming system(s) 120 about the portion of the game the player is currently playing and/or network connection parameters for the portion of the game the player is currently playing and/or portions of the game associated with the current portion. The streaming system(s) 120 may utilize information provided by the game and/or information about portion of the game retrieved from the game network connection parameter datastore 122 and information about the player's current network connection to determine that the network connection parameters of the quick time event portion of the game are not met by the player's current network connection. Alternatively or additionally, the streaming system(s) 120 may utilize an API to cause the game to prompt the player in-game. In response, the streaming system(s) 120 may determine an amount to slow down the execution or gameplay of the game.

While the above example referred to changing virtual hardware parameters, such as tick rate, to slow down the gameplay of the game, other approaches are contemplated. For example, the streaming system(s) 120 may utilize memory scanning and/or a debugger or an API to access and modify various parameters of the game to widen a response window for the player to successfully react to audiovisual prompts to, for example, a response window intended by the developer of the game. A particular example of a portion of a game which may suffer from an insufficient network connection causing increased difficultly may include the player's character falling and having to use thrusters to avoid obstacles within a response window. Because of the latency, by the time the player sees the audiovisual cues for the beginning of the response window, the response window may be near its end. This problem is compounded by the trip time for the player's input to reach the streaming system(s) 120.

To address the above scenario, the streaming system(s) 120 may use a memory editor to modify the coefficient of gravity or modify the falling speed directly during the portion of the game. Because the falling speed is reduced, the response window for the player to successfully react to audiovisual cues for the obstacles may substantially be matched to the response window provided for players playing on a local game client device 130. Depending on the implementation, the game may provide an indication of when a specific portion of the game is being played and to expose the timing requirements, variables to address those timing requirements and so on to the streaming system 120 (e.g., via an API).

Additionally, in operation, the gaming system(s) 110, streaming system(s) 120, and/or game client devices 130 may provide for device independent input processing of player input to reduce advantages and/or disadvantages associated with different network or gameplay connections and/or setups. For example, in cases of streaming players versus non-streaming players, the gaming system(s) 110 disclosed herein may reduce unintended or unfair advantages of non-streaming players over streaming players caused by the non-streaming players experiencing an input-delay time advantage versus streaming player. However, the device independent input processing techniques herein are not limited to addressing streaming vs. non-streaming differentials, network condition differentials or latency differentials. The device independent input processing disclosed herein may be used to address input delay time-advantages caused by different input devices and/or different gaming devices (e.g., a console A, a console B or a PC).

To address input delay time-advantages, some examples may build-in an amount of input processing delay to the game that would be experienced by any player playing the game, whether on a local game client device or a streaming client device interacting with a streaming system. For example, a game may be configured to include an input processing delay of 100 ms, whether played in a streaming or non-streaming environment and regardless of gaming device or gaming setup. In an example according to this disclosure having an input processing delay of 100 ms, where the non-streaming player's player input arrives 10 ms after being input by the non-streaming player and the streaming player's player input arrives 80 ms after being input by the streaming player, the gaming system(s) 110 hosting the online match may delay processing of the non-streaming player's player input by 90 ms (e.g., the difference of 100 ms and 10 ms) and may delay processing of the streaming player's player input by 20 ms (e.g., the difference of 100 ms and 80 ms). As such, both player's player input may be processed substantially at the same time, thereby reducing or eliminating input delay time-advantages and/or disadvantages. In addition to addressing input delay time-advantages, configuring a game to include an input processing delay may also reduce or eliminate the experiential difference between streaming and non-streaming gameplay (e.g., for a user who switches between steaming and non-streaming play), promote fairness in a multi-player session with a mixed group of players, improve the perceived quality of a streaming experience versus a non-streaming experience and provide consistency in the gameplay experience generally.

In some examples, the streaming system(s) 120 and/or game system(s) 110 may operate to provide device independent input processing based on the end-to-end latency associated with the player input. As mentioned above, in some examples, the end-to-end latency for the player input may include a input device latency. When receiving a player input for a game from a client device 140, 130, the system(s) 120, 110 may determine a difference between an input processing delay associated with the game and the end-to-end latency associated with the player input. System(s) 120, 110 may delay the processing of the player input by the resulting difference or schedule the input for processing after a time period equal to the difference has passed.

In some examples, the streaming system(s) 120 and/or game system(s) 110 may operate to provide device independent input processing based on a time stamp associated with the player input. For example, the client device 140, 130 receiving the input from streaming player 144 via the input device 142 may include a timestamp in the transmission of the player input to the system(s) 120, 110 that will process the player input (e.g., the streaming system(s) 120 may forward the time stamp to the gaming system(s) 110 in the case of a multiplayer or hosted online game). When receiving a player input for a game from a client device 140, 130, the system(s) 120, 110 may determine a first difference between the time stamp of the player input and a current time. The system(s) 120, 110 may then determine a second difference between an input processing delay associated with the game and the first difference. The system(s) 120, 110 may delay the processing of the player input by the resulting second difference or schedule the input for processing after a time period equal to the second difference has passed.

In any case, once the player input has been scheduled, the system(s) 120, 110 may wait for the scheduled time and then process the player input.

The example environment 100 may further include matchmaking system(s) 150 to match players 134, 144 who wish to play the same game and/or game mode with each other. Players 134, 144 may be matched according to one or more metrics associated with the players 134, 144, such as skill at a particular game. The matchmaking system(s) 150 may receive an indication from the game system(s) 110 and/or the streaming system(s) 120 of players 134, 144 who wish to play an online game.

The matchmaking system(s) 150 may access information about the players 134, 144 who wish to play a particular game, such as from a player datastore 152. The information about the players 134, 144 may include metrics usable for matchmaking. Such metrics may include metrics based on an estimate of a player's expected performance in a game based at least in part on historic game performance data of the player. Once the matchmaking system(s) 150 access, the matchmaking system(s) 150 may be configured to match players 134, 144 based at least in part on their respective metrics.

Figure 2:
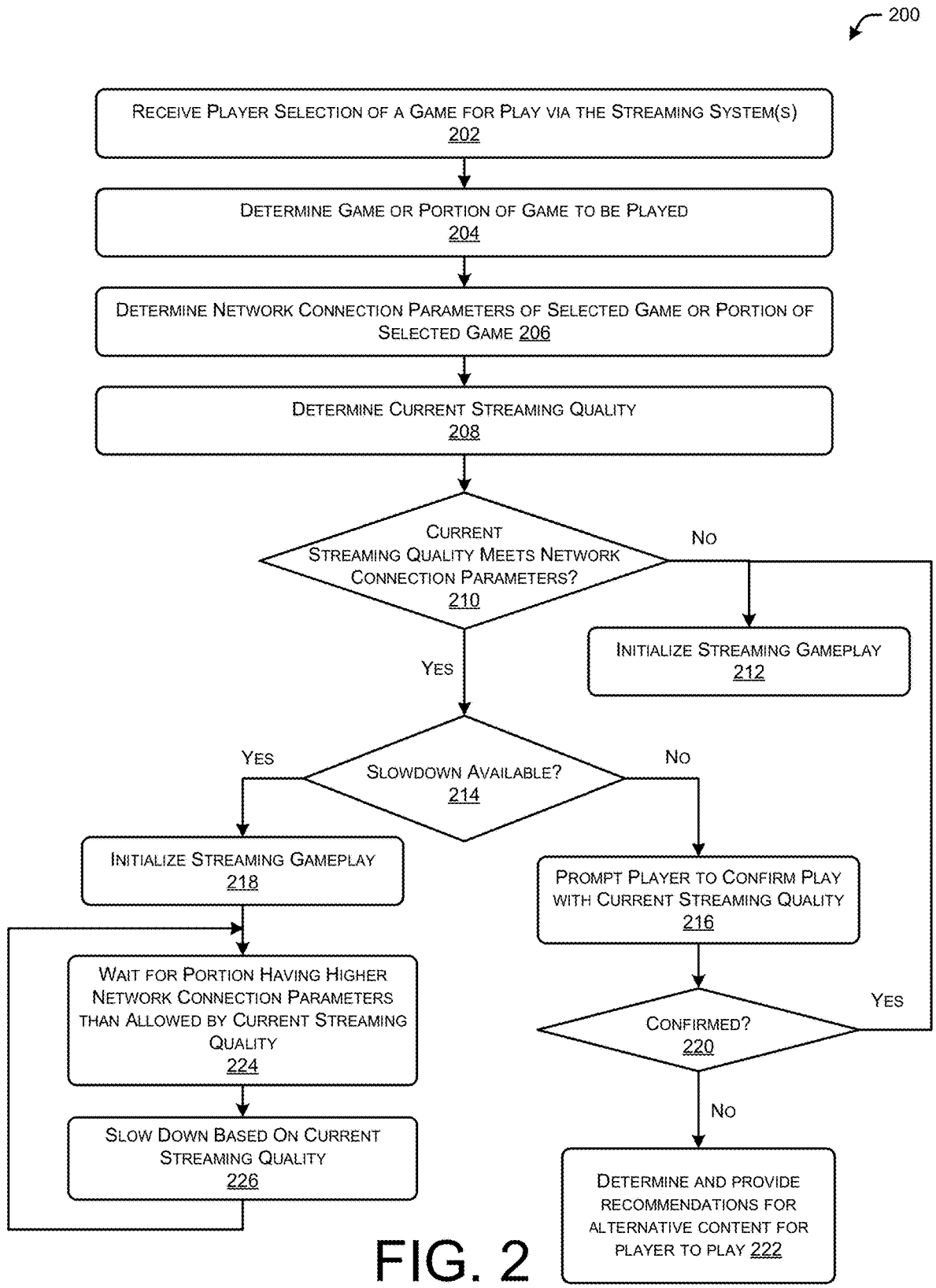
FIG. 2 illustrates a flow diagram of an example method that may improve online gaming experiences for streaming players based on the streaming players' current network connection, in accordance with example embodiments of the disclosure.

FIG. 2 illustrates a flow diagram of an example method 200 that may improve online gaming experiences for streaming players based on the streaming players' current network connection, in accordance with example embodiments of the disclosure. The method 200 may be performed by the streaming system(s) 120, individually or in cooperation with one or more other elements of the environment 100.

At block 202, the streaming system(s) 120 may receive a player's selection of a game for play via the streaming system(s) 120. For example, the player may select a game for play by a library functionality of the streaming system(s) 120.

At block 204, the streaming system(s) 120 may determine the game the player has selected for play and/or a portion of the selected game the player is likely to play. For example, the streaming system(s) 120 may determine the portion of the selected game the player 144 is likely to play based on save files or log data from the player's most recent interaction with the game via the streaming system(s) 120.

At block 206, the streaming system(s) 120 may retrieve network connection parameters for the selected game and/or the determined portion and/or closely associated portions of the selected game from the game network connection parameter datastore 122.

At block 208, the streaming system(s) 120 may determine a current streaming quality of the player's current network connection. As discussed above, the player's current streaming quality may be determined based on a variety of factors such as end-to-end latency, ping and/or other network connection metrics.

At block 210, the streaming system(s) 120 may determine if the current streaming quality meets the network connection parameters of the game or the portion(s) of the game. If so, the process may continue to block 212 where the streaming system(s) 120 may initialize streaming gameplay of the selected game. Otherwise, the process may continue to block 214.

At block 214, the streaming system(s) 120 may determine if a slowdown functionality is available for the game. If so, the process may continue to block 216. Otherwise, the process may continue to block 218.

At block 216, the streaming system(s) 120 may prompt the player to confirm play with current streaming quality. As mentioned above, the streaming system(s) 120 may inform the player that streaming gameplay under the current network conditions is likely to result in more difficult than normal or disrupted gameplay. At 220, the streaming system(s) 120 may determine whether the player confirmed the choice to play the game with the current network conditions. If so, the process may continue to block 212 where the streaming system(s) 120 may initialize streaming gameplay of the selected game. Otherwise, the process may continue to block 222. At block 222, the streaming system(s) 120 may determine and provide recommendation for alternative content (e.g., different modes, portions or games) for the player to play under the current network conditions. In some examples, the streaming systems 120 may determine and provide the recommendation for alternative content when requesting confirmation at block 216.

Returning to block 218, after determining a slowdown functionality is available (e.g., for the game or available in general), the streaming system(s) 120 may initialize streaming gameplay of the selected game. Then, at block 224, the streaming system(s) 120 may wait for a portion of the game that has higher network connection parameters than can be met by the current streaming quality. As discussed above, the streaming system(s) 120 may determine the game has reached the portion based on save files, log data, an API provided by the game, or similar information. Then, at block 226, the streaming system(s) 120 may cause a slowdown of the gameplay as discussed above with regard to FIG. 1. For example, the streaming system(s) 120 may determine an amount of slowdown based on the current streaming quality and the network connection parameters of the current portion of the game. Upon the end of the current portion, the streaming system(s) 120 may remove the slowdown and the process may then return to block 224. For example, the streaming system(s) 120 may determine a current portion of the game has ended based on an autosave function of the game creating an autosave file associated with another portion of the game that is subsequent to the current portion of the game. In addition or alternatively, the game may be configured to provide an indication to the streaming system(s) 120 that the current portion ended, for example, via an API. Of course, these are merely examples and many other approaches would be apparent in view of this disclosure.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

Figure 3:
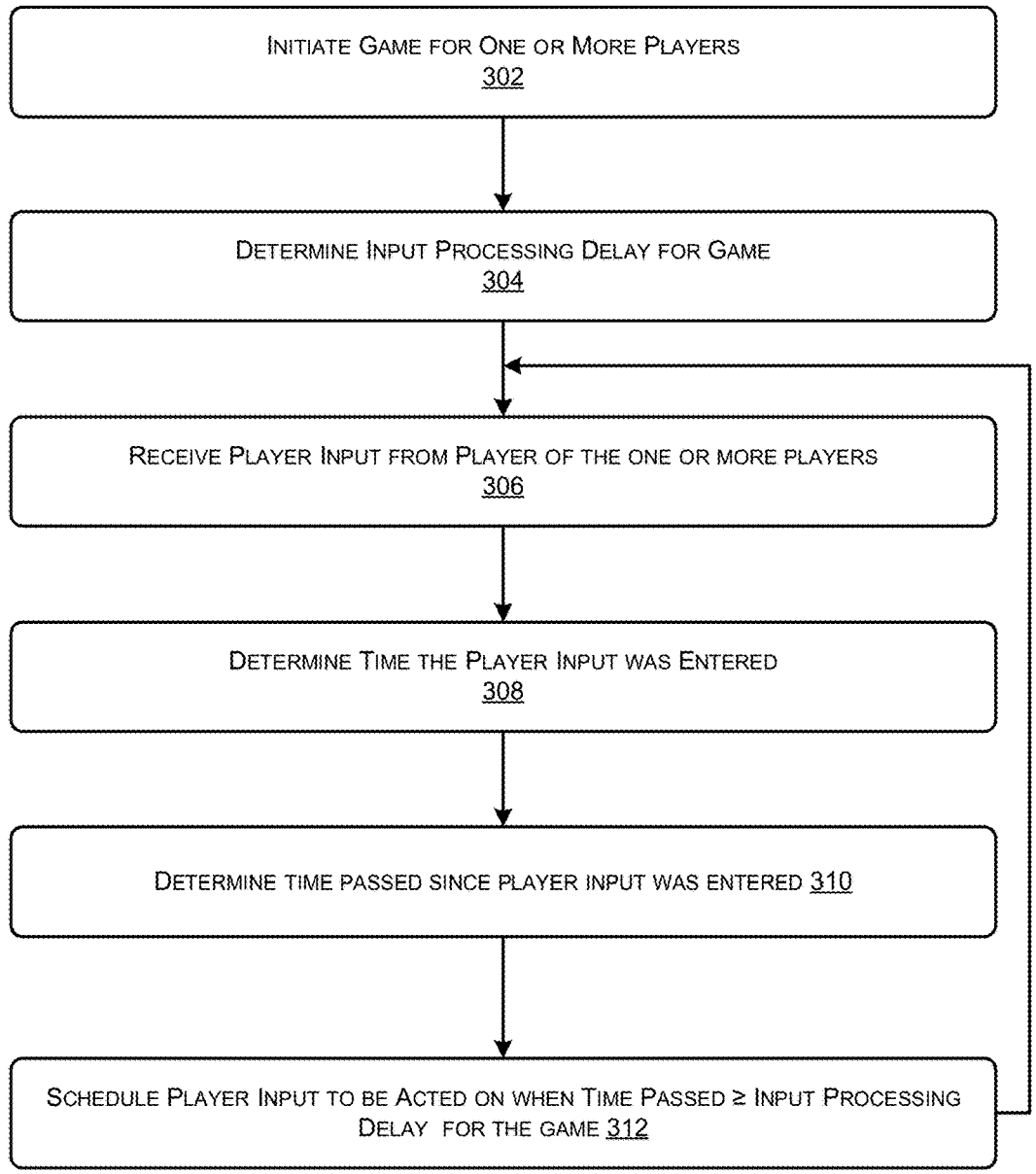
FIG. 3 illustrates a flow diagram of an example method by which system(s) may provide device independent input processing, in accordance with example embodiments of the disclosure.

FIG. 3 illustrates a flow diagram of an example method 300 by which system(s) may provide device independent input processing, in accordance with example embodiments of the disclosure. More particularly, the example method 300 may provide for the scheduling of player input based on an input processing delay for a game. Example method 300 may be performed in parallel with example method 400 described below with respect to FIG. 4. The method 300 may be performed by the system(s) 110 and/or 120, individually or in cooperation with one or more other elements of the environment 100.

At block 302, the system may initiate a game for one or more players. At block 304, the system may determine an input processing delay for the game. For example, the system may retrieve the input processing delay for the game from the game network connection parameter datastore 122.

At block 306, during the course of the game, the system may receive a player input from a player of the one or more players. The system may determine a time the player input was entered at block 308. Depending on the example implementation, the system may use one or both of the time stamp based determination or the latency based determination presented above for determining the time the player input was entered. However, these are merely examples and other approaches determining the time the player input was injured may be utilized.

At block 310, the system may determine a time that has passed since the player input was entered based on the time the player input was entered and the current time. Then, at block 312, the system may schedule the player input to be acted on when the time passed is greater than or equal to the input processing delay for the game.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
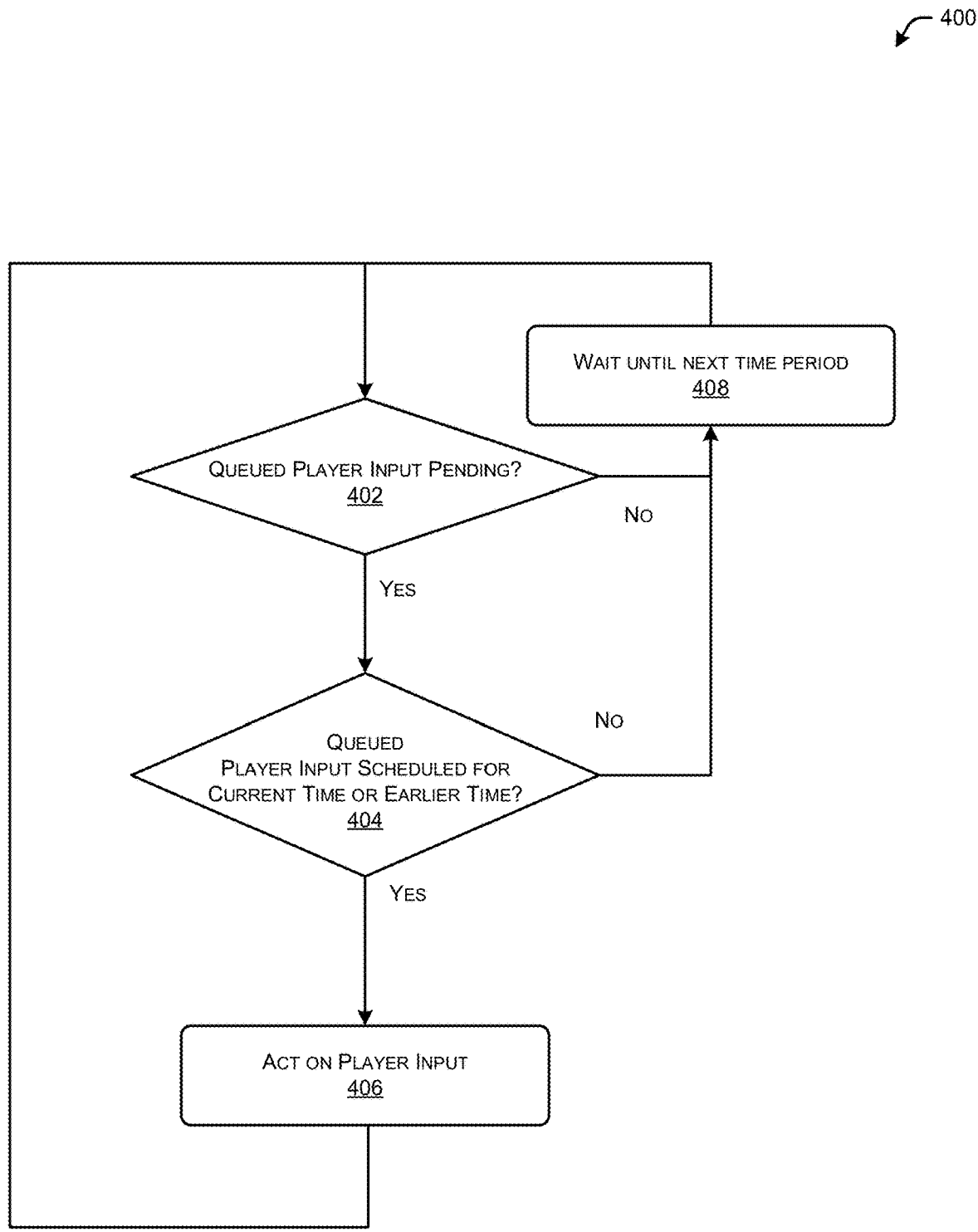
FIG. 4 illustrates a flow diagram of an example method by which system(s) may provide device independent input processing, in accordance with example embodiments of the disclosure.

FIG. 4 illustrates a flow diagram of an example method 400 by which system(s) may provide device independent input processing, in accordance with example embodiments of the disclosure. More particularly, the example method 400 may provide for the processing of player inputs that have been scheduled for processing upon expiration of an input processing delay. Example method 400 may be performed in parallel with example method 300 described above with respect to FIG. 3. The method 400 may be performed by the system(s) 110 and/or 120, individually or in cooperation with one or more other elements of the environment 100.

At block 402, the system may determine whether a queued player input is pending. If so, the method may continue to block 404. Otherwise, the method may proceed to block 408 to wait until the next time period before returning to block 402.

At block 404, the system may determine whether a queued player input is scheduled for the current time or for an earlier time (e.g., the time passed since the player input was entered is greater or equal to the input processing delay for the game). If so, the method may continue to block 406. Otherwise, the method may proceed to block 408 to wait until the next time period before returning to block 402.

At block 406, the system may process the player input that was scheduled for the current time or for an earlier time. The method may then return to block 402.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 5:
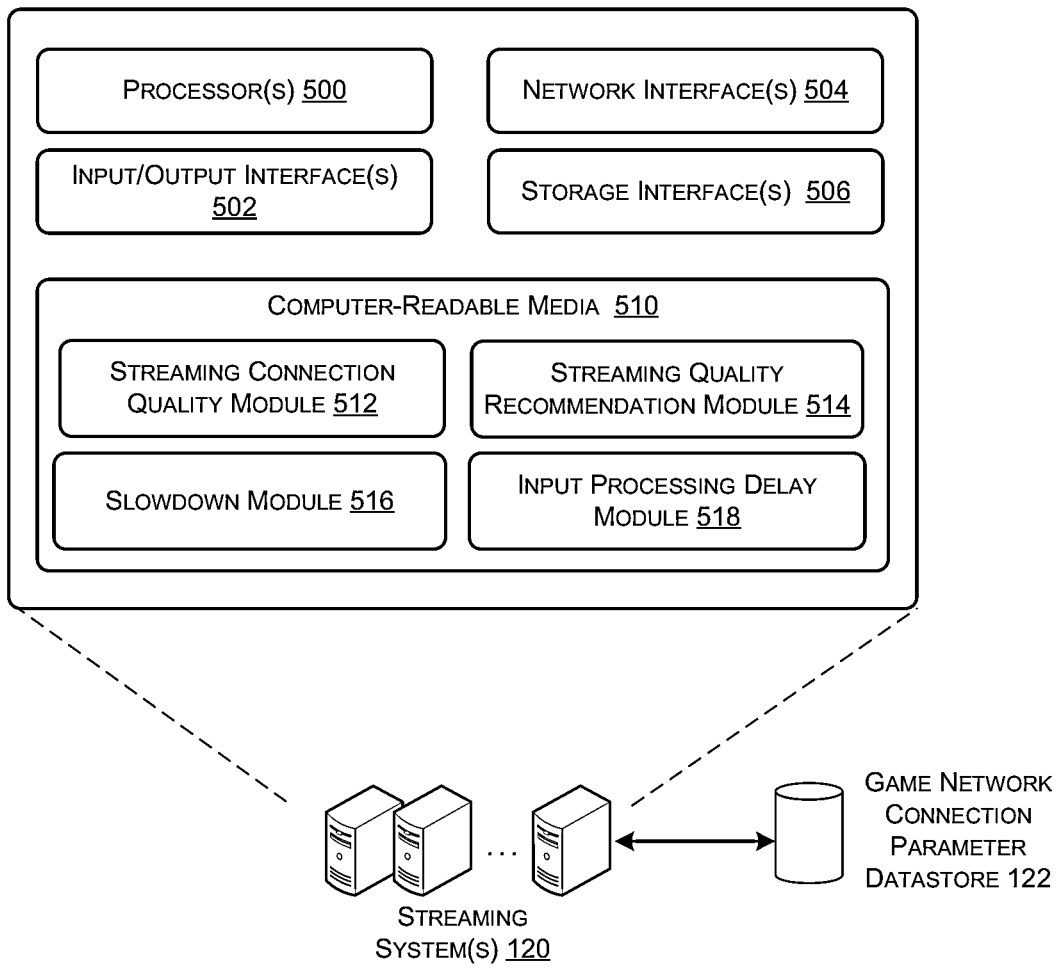
FIG. 5 illustrates a block diagram of example streaming system(s) that may improve online gaming experiences for streaming players and/or providing device independent input processing, in accordance with example embodiments of the disclosure.

FIG. 5 illustrates a block diagram of example streaming system(s) 120 that may improve online gaming experiences for streaming players and/or providing device independent input processing, in accordance with example embodiments of the disclosure. The streaming system(s) 120 may include one or more processor(s) 500, one or more input/output (I/O) interface(s) 502, one or more network interface(s) 504, one or more storage interface(s) 506, and computer-readable media 510.

In some implementations, the processors(s) 500 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 500 may possess its own local memory, which also may store program modules, program data, and/or one or more operating system(s). The one or more processor(s) 500 may include one or more cores.

The one or more input/output (I/O) interface(s) 502 may enable the streaming system(s) 120 to detect interaction with a user and/or other system(s), such as one or more game system(s) 110 or one or more streaming system(s) 120. The I/O interface(s) 502 may include a combination of hardware, software, and/or firmware and may include software drivers for enabling the operation of any variety of I/O device(s) integrated on the streaming system(s) 120 or with which the streaming system(s) 120 interacts, such as displays, microphones, speakers, cameras, switches, and any other variety of sensors, or the like.

The network interface(s) 504 may enable the streaming system(s) 120 to communicate via the one or more network(s). The network interface(s) 504 may include a combination of hardware, software, and/or firmware and may include software drivers for enabling any variety of protocol-based communications, and any variety of wireline and/or wireless ports/antennas. For example, the network interface(s) 504 may comprise one or more of a cellular radio, a wireless (e.g., IEEE 802.1x-based) interface, a Bluetooth® interface, and the like. In some embodiments, the network interface(s) 504 may include radio frequency (RF) circuitry that allows the streaming system(s) 120 to transition between various standards. The network interface(s) 504 may further enable the streaming system(s) 120 to communicate over circuit-switch domains and/or packet-switch domains.

The storage interface(s) 506 may enable the processor(s) 500 to interface and exchange data with the computer-readable medium 510, as well as any storage device(s) external to the streaming system(s) 120, such as the player datastore 152.

The computer-readable media 510 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 510 may be implemented as computer-readable storage media (CRSM), which may be any available physical media accessible by the processor(s) 500 to execute instructions stored on the memory 510. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 500. The computer-readable media 510 may have an operating system (OS) and/or a variety of suitable applications stored thereon. The OS, when executed by the processor(s) 500 may enable management of hardware and/or software resources of the streaming system(s) 120.

Several functional blocks having instruction, data stores, and so forth may be stored within the computer-readable media 510 and configured to execute on the processor(s) 500. The computer readable media 510 may have stored thereon a streaming connection quality module block 512, a streaming quality recommendation module block 514, a connection slowdown module block 516, and an input processing delay module block 518. It will be appreciated that each of the functional blocks 512, 514, 516, and 518 may have instructions stored thereon that when executed by the processor(s) 500 may enable various functions pertaining to the operations of the streaming system(s) 120.

The instructions stored in the streaming connection quality module block 512, when executed by the processor(s) 500, may configure the streaming system(s) 120 to determine the current streaming connection quality of a client device (e.g., streaming client devices 140) as discussed above.

The instructions stored in the streaming quality recommendation module block 514, when executed by the processor(s) 500, may configure the streaming system(s) 120 to determine whether the player's current network connection meets or exceeds network connection parameters for a game and, based there on, prompt the player with a suggestion to play a different mode or portion of the game and/or recommend the player play a different game altogether as discussed above.

The instructions stored in the connection slowdown module block 516, when executed by the processor(s) 500, may configure the streaming system(s) 120 to modify the presentation of the game or the portion of the game based on the player's current network connection. For example, as discussed above, the streaming system(s) 120 may cause execution of the game by the streaming system(s) 120 to be slowed based on the player's current connection, resulting in a time dilation effect in the presentation of the game (e.g., presenting the game in slow motion).

The instructions stored in the input processing delay module block 518, when executed by the processor(s) 500, may provide device independent input processing based on the end-to-end latency or a time stamp associated with the player input. For example, the input processing delay module block 518 may schedule the processing of the input based on an amount of time that has passed since the player entered the player input and an input processing delay associated with the game. Once the player input has been scheduled, the system(s) 120 may wait for the scheduled time and then process the player input. As mention above, the operations of the input processing delay module block 518 may also be performed by the game system(s) 110 and/or the game client devices 130.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
 receiving, from a client device and by a streaming system, a selection of a game to be played via the streaming system;
 determining a portion of the game associated with a save file associated with the game;
 determining network connection parameters based at least in part on the portion of the game, the network connection parameters including a first network connection parameter associated with a first portion of the game including a first event being presented at a first period of time and a second network connection parameter associated with a second portion of the game including a second event being presented at a second period of time that is different than the first period of time, wherein the first network connection parameter is different than the second network connection parameter;
 determining a current streaming quality of a network connection of the client device;
 determining the current streaming quality does not meet the network connection parameters; and
 based on determining that the current streaming quality does not meet the network connection parameters, causing, based at least in part on the current streaming quality and the network connection parameters, at least a portion of a gameplay of the game to be slowed to widen a response time window for receiving player input.

2. The computer-implemented method of claim 1, wherein the portion of the game is a first level or a first area in the game.

3. The computer-implemented method of claim 1, wherein the causing at least the portion of the gameplay of the game to be slowed comprises:
 slowing an execution rate of the game on the streaming system at least during the gameplay of the portion of the game based at least in part on the current streaming quality and the network connection parameters.

4. The computer-implemented method of claim 1, wherein causing at least the portion of the gameplay of the game to be slowed comprises:
changing one or more variables of the game in memory during execution of the game to widen the response time window for receiving the player input to successfully react to audiovisual prompts.

5. The computer-implemented method of claim 4, wherein the network connection parameters include an end-to-end latency.

6. The computer-implemented method of claim 1, further comprising:
determining a latency for the client device including a transmission latency between the client device and the streaming system and an input device latency of an input device of the client device;
determining a difference between an input processing delay for the game and the latency for the client device; and
scheduling processing of the player input based on the difference.

7. A system, comprising:
one or more processors; and
one or more computer-readable media storing computer-executable instructions that, when executed by the one or more processors, cause the one or more processors to:
receive, from a client device, a selection of a game to be played via a streaming system;
determine network connection parameters based at least in part on the game, the network connection parameters including a first network connection parameter associated with a first portion of the game and a second network connection parameter associated with a second portion of the game, wherein the first network connection parameter is different than the second network connection parameter;
determine a current streaming quality of a network connection of the client device;
determine the current streaming quality does not meet the network connection parameters; and
based on determining that the current streaming quality does not meet the network connection parameters, cause, based at least in part on the current streaming quality and the network connection parameters, at least a portion of a gameplay of the game to be slowed to widen a response time window for receiving player input, wherein causing the at least the portion of the gameplay of the game to be slowed includes a time dilation effect in a presentation of the game.

8. The system of claim 7, wherein the computer-executable instructions further cause the one or more processors to:
determine a portion of the game associated with one or more save files; and
wherein to determine the network connection parameters based at least in part on the game, the computer-executable instructions further cause the one or more processors to determine the network connection parameters based at least in part on the portion of the game associated with the one or more save files.

9. The system of claim 8, wherein the portion of the game is a first level or a first area in the game.

10. The system of claim 8, wherein the computer-executable instructions further cause the one or more processors to:
determine the portion of the game associated with the one or more save files.

11. The system of claim 8, wherein:
to determine the network connection parameters based at least in part on the game, the computer-executable instructions further cause the one or more processors to determine the network connection parameters based at least in part on the portion of the game; and
the system causes at least the portion of the gameplay of the game to be slowed based at least in part on the current streaming quality and the network connection parameters by changing one or more variables of the game in memory during execution of the game to widen the response time window for receiving the player input.

12. The system of claim 7, wherein the system causes at least the portion of the gameplay of the game to be slowed based at least in part on the current streaming quality and the network connection parameters by slowing an execution rate of the game on the streaming system at least during the gameplay of the portion of the game based at least in part on the current streaming quality and the network connection parameters.

13. The system of claim 7, wherein the network connection parameters include an end-to-end latency.

14. The system of claim 7, wherein the computer-executable instructions further cause the one or more processors to delay processing of the player input based on a time elapsed since the player input was received and an input processing delay for the game.

15. One or more non-transitory computer-readable media storing computer-executable instructions that, when executed, cause one or more processors to:
receive, from a client device, a selection of a game to be played via a streaming system;
determine network connection parameters based at least in part on the game, the network connection parameters including a first network connection parameter associated with a first portion of the game including a first event being presented at a first period of time and a second network connection parameter associated with a second portion of the game including a second event being presented at a second period of time that is different than the first period of time, wherein the first network connection parameter is different than the second network connection parameter;
determine a current streaming quality of a network connection of the client device;
determine the current streaming quality does not meet the network connection parameters; and
based on determining that the current streaming quality does not meet the network connection parameters, cause a prompt to be displayed on the client device, the prompt regarding alternative content to play.

16. The one or more non-transitory computer-readable media of claim 15, wherein the computer-executable instructions further cause the one or more processors to:
determine a portion of the game associated with one or more save files; and
wherein to determine the network connection parameters based at least in part on the game, the computer-executable instructions further cause the one or more processors to determine the network connection parameters based at least in part on the portion of the game associated with the one or more save files.

17. The one or more non-transitory computer-readable media of claim 16, wherein the portion of the game is a first level or a first area in the game associated with a first mode of play of the game.

18. The one or more non-transitory computer-readable media of claim 17, wherein the alternative content is one or more of:
   a second mode of play of the game;
   a second level, second area, or second event in the game; or
   a different game or portion of the different game.

19. The one or more non-transitory computer-readable media of claim 15, wherein the computer-executable instructions further cause the one or more processors to:
   receive a player input during gameplay of the game; and
   delay processing of the player input based on a time elapsed since the player input was received and an input processing delay for the game.

20. The one or more non-transitory computer-readable media of claim 15, wherein the computer-executable instructions further cause the one or more processors to, based on determining that the current streaming quality does not meet the network connection parameters, cause at least a portion of a gameplay of the game to be slowed to widen a response time window for receiving player input, wherein causing the at least the portion of the gameplay of the game to be slowed includes presenting the game in slow motion.

* * * * *